United States Patent
Mitra et al.

(10) Patent No.: US 8,699,392 B2
(45) Date of Patent: Apr. 15, 2014

(54) METHOD AND APPARATUS FOR CONSERVING ACCESS POINT POWER USAGE DURING LOW NETWORK USAGE INTERVALS

(75) Inventors: Sanjib Mitra, Bangalore (IN); Ajay Kumar Singh, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 556 days.

(21) Appl. No.: 12/912,361

(22) Filed: Oct. 26, 2010

(65) Prior Publication Data

US 2012/0099495 A1 Apr. 26, 2012

(51) Int. Cl.
*H04W 52/02* (2009.01)
*H04W 4/00* (2009.01)
*H04W 52/00* (2009.01)

(52) U.S. Cl.
CPC .................................... *H04W 52/00* (2013.01)
USPC ........................................................ 370/311

(58) Field of Classification Search
CPC .................................................... H04W 52/00
USPC ........................................................ 370/311
See application file for complete search history.

(56) References Cited

U.S. PATENT DOCUMENTS

| | | | |
|---|---|---|---|
| 5,511,069 A | 4/1996 | England et al. | |
| 7,281,143 B2 | 10/2007 | Parra et al. | |
| 7,657,234 B2 | 2/2010 | Qu et al. | |
| 7,715,800 B2 | 5/2010 | Sinha | |
| 8,102,825 B2 * | 1/2012 | Kalhan | 370/338 |
| 2005/0154933 A1 | 7/2005 | Hsu et al. | |
| 2008/0062942 A1 | 3/2008 | Hills et al. | |
| 2008/0181184 A1 | 7/2008 | Kezys | |
| 2009/0034443 A1 | 2/2009 | Walker et al. | |
| 2009/0191876 A1 | 7/2009 | Jain et al. | |
| 2009/0325495 A1 | 12/2009 | LaBerge | |
| 2010/0002610 A1 | 1/2010 | Bowser et al. | |
| 2010/0002614 A1 * | 1/2010 | Subrahmanya | 370/311 |
| 2010/0003921 A1 | 1/2010 | Godlewski | |

(Continued)

FOREIGN PATENT DOCUMENTS

| | | |
|---|---|---|
| WO | 2007141536 A1 | 12/2007 |
| WO | 2009108589 A1 | 9/2009 |
| WO | 2010030952 A2 | 3/2010 |

OTHER PUBLICATIONS

Amit P. Jardosh et al—"Green WLANs: On-Demand WLAN Infrastructures"—Mobile Network Appl—2009—pp. 798-814. International Search Report and Written Opinion for International Application No. PCT/US2011/054226 mailed on Dec. 8, 2011.
Non Final Office Action mailed Jul. 25, 2011 in U.S. Appl. No. 12/415,539, Rajiv Iyer, filed Mar. 31, 2009.

(Continued)

*Primary Examiner* — Shaq Taha (57) ABSTRACT

A method for conserving the power usage of access points in a WLAN is disclosed. The method includes detecting, by a peripheral access point during periods of low network usage, that a mobile device has entered a wireless network coverage area. The method also includes providing, by the peripheral access point, initial services to the mobile device and monitoring movements of the mobile device in the network coverage area. Upon determining that the mobile device is in a vicinity of a powered-off non-peripheral access point, powering on a first non-peripheral access point which is determined to be closest to the mobile device and a set of first concentric access points to provide a coverage buffer around the first access point and using the first non-peripheral access point and the set of first concentric access points as serving access points for the mobile device.

18 Claims, 6 Drawing Sheets

(56) References Cited

U.S. PATENT DOCUMENTS

| | | |
|---|---|---|
| 2010/0138549 A1 | 6/2010 | Goel et al. |
| 2010/0165959 A1* | 7/2010 | Park et al. .................... 370/338 |
| 2010/0195549 A1 | 8/2010 | Aragon et al. |
| 2010/0211806 A1 | 8/2010 | Diab et al. |
| 2010/0250992 A1 | 9/2010 | Iyer et al. |

OTHER PUBLICATIONS

Non Final Office Action mailed Apr. 18, 2012 in U.S. Appl. No. 12/415,539, Rajiv Iyer, filed Mar. 31, 2009.

Final Office Action mailed Dec. 14, 2011 in U.S. Appl. No. 12/415,539, Rajiv Iyer, filed Mar. 31, 2009.

Final Office Action mailed Oct. 23, 2012 in U.S. Appl. No. 12/415,539, Rajiv Iyer, filed Mar. 31, 2009.

* cited by examiner

METHOD AND APPARATUS FOR
CONSERVING ACCESS POINT POWER
USAGE DURING LOW NETWORK USAGE
INTERVALS

FIELD OF THE DISCLOSURE

The present disclosure relates generally to power savings in a Wireless Local Area Network (WLAN) and more particularly to optimizing power usage of access points during low network usage intervals.

BACKGROUND

It is beneficial for corporations that deploy medium to large Wireless Local Area Network (WLAN) infrastructures to effectively manage energy costs, including energy costs for associated access points, without adversely affecting coverage and end user performance. A typical access point in a WLAN may consume about 10-16 Watts of power, depending on a number of factors including, the number of radio frequency chains that are active within the access point. It has been noted that a small subset of the total deployed access points in a network may be used during the day. Even fewer of these access points may be used at nights and on weekends, depending upon the primary function of the network. Hence, a majority of the access points in a medium to large WLAN may be idle for long periods of time.

In a WLAN configuration with hundreds of access points, energy consumption by under-utilized access points can be significant. Some of these WLAN installations may implement an always-on power saving scheme, a threshold-based power saving scheme, or a schedule-based power saving scheme. It will be appreciated by those of ordinary skill in the art that costs associated with the always-on scheme are significant. Yet threshold-based schemes or schedule-based power saving schemes may cause either signal-strength degradation or impact coverage/availability during the switch off periods. For example, access points have a finite initialization time from a cold start to a beaconing ready state when capable of associating with an associated client device. Therefore, a power saving scheme that completely powers down an access point may not be capable of re-initializing the access point in time to allow it to function as a reserve resource. Furthermore, a fully powered-down access point also may need to be minimally self powered by, for example battery or solar components, so that is can be remotely switched on again.

WLAN client devices can include any wireless communication device such as mobile radios, cellular telephones, personal computers, personal digital assistants (PDAs), and the like. In most situations, client devices are associated with an access point from a geographical location of frequent usage, where the client device is most likely to remain stationary and associated with a single access point for a period of time. An example of a location of frequent usage may be an assigned desk in a corporate office, an internet café, an airport gate waiting area, or a checkout aisle of a department store. Such stationary usage of WLANs makes it easy to predict when to power off particular access points in the WLAN. However, as more mobile devices operate within WLANs, the WLANs need to be configured to effectively handle these mobile units during low network utilization periods, with the reliability of an always-on power saving scheme.

Accordingly, there is a need for efficiently conserving the power usage of access points in a WLAN during low network usage intervals, without impacting coverage to users of the WLAN.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the invention are directed to methods and apparatuses for efficiently conserving power usage of access points in a WLAN during low usage intervals. A method implemented in an embodiment of the invention includes detecting, by a peripheral access point during periods of low network usage, that a mobile device has entered a wireless network coverage area. The method also includes providing, by the peripheral access point, initial services to the mobile device and monitoring movements of the mobile device in the network coverage area. Upon determining that the mobile device is in a vicinity of a powered-off non-peripheral access point, the method further includes powering on a first non-peripheral access point which is determined to be closest to the mobile device and a set of first concentric access points to provide a coverage buffer around the first access point and using the first non-peripheral access point and the set of first concentric access points as serving access points for the mobile device.

Figure 1:
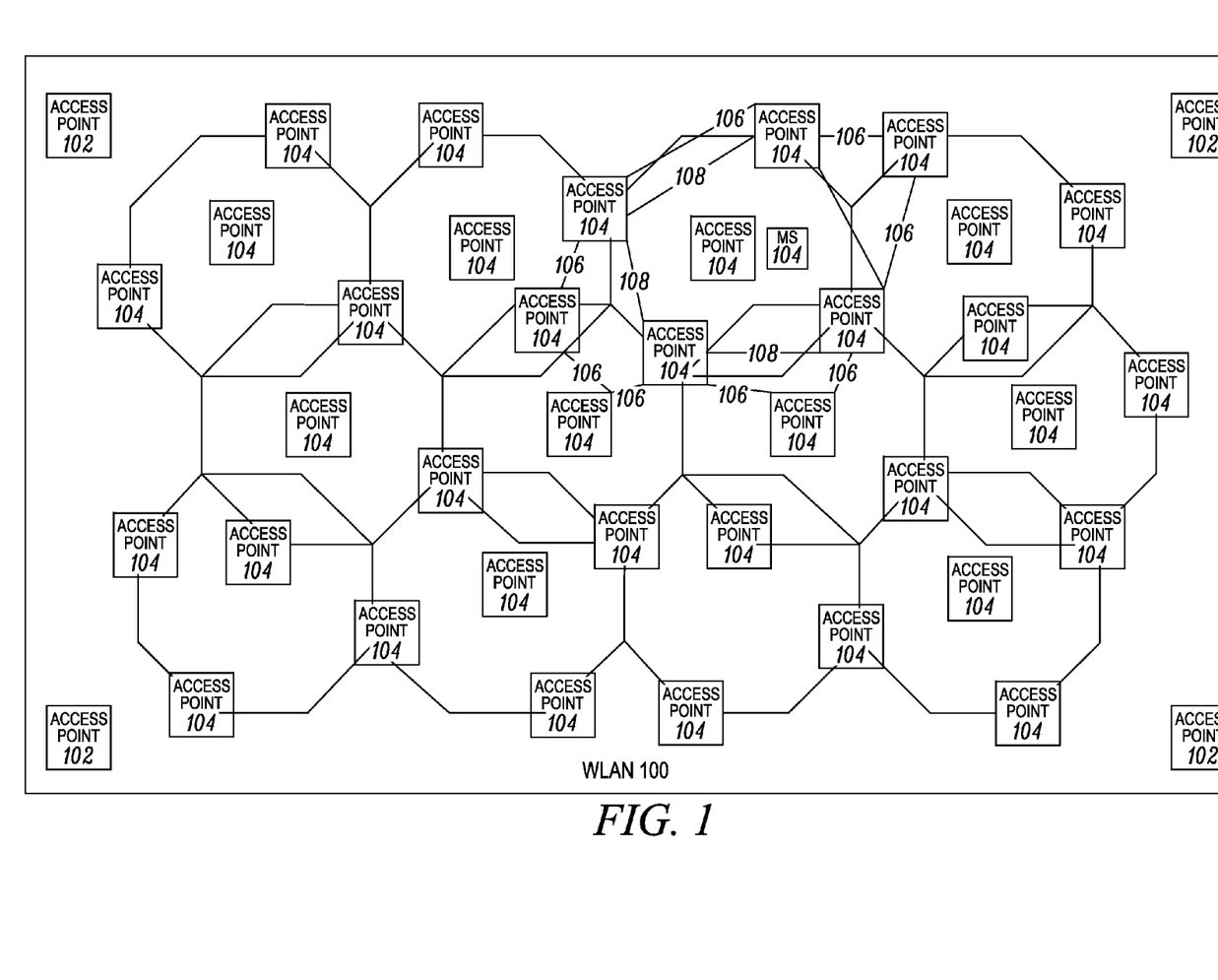
FIG. 1 is a block diagram of a WLAN with multiple access points in accordance with some embodiments.

FIG. 1 is a block diagram of a WLAN 100 whose operation includes implementing one or more power saving schemes during low network utilization intervals. In some embodiments, WLAN 100 is an enterprise class WLAN that employs a large number of access points to provide coverage to a predefined area. WLAN 100 operates, for example, using BLUETOOTH, IEEE 802.11, IEEE 802.16, Worldwide Interoperability for Microwave Access (WiMax), and the like. An access point employed in WLAN 100 is a transceiver that connects wireless devices within the WLAN to each other. The access point can also serve as the point of interconnection between the WLAN and a fixed wire network. Each access point can serve multiple wireless devices within a defined network area. As wireless devices move beyond the range of one access point, they are automatically handed over to the next access point, depending on the network standard implemented by the WLAN. Wireless devices may include relatively stationary devices, such as laptops or desktop computers, or mobile devices, such as cellular telephones, portable game players, or radios.

WLAN 100 utilizes collaborative power saving schemes at multiple access points. WLAN 100 includes one or more peripheral access points 102. Each peripheral access point 102 is an access point that is deployed at the edge/boundary of the WLAN coverage area. Depending on entry points to the WLAN coverage area, in some embodiments, at least one of the peripheral access points is always powered on. For example, if the WLAN provides wireless coverage for a university campus with two entry gates, the peripheral access points can be configured to always provide coverage for the two entry points. In this example, there may not be a need to provide peripheral access points for the entire WLAN coverage area boundary. In other embodiments, peripheral access points may be configured to provide coverage to the entire boundary periphery of the WLAN and one or more of the peripheral access points are always powered on. Peripheral access points 102 are typically the first access points to detect the presence of a mobile device 110 in the WLAN coverage area.

WLAN 100 also includes multiple non-peripheral access points 104. Each non-peripheral access point 104 is an access point deployed within the WLAN coverage area where peripheral access points 102 provide no coverage or limited coverage. Non-peripheral access points 104 need not be powered on during low network usage. At least one non-peripheral access point 112 may always be powered on in an area in the WLAN where other peripheral access points 102 provide no coverage.

When non-peripheral access points 104 are powered off, the radio frequency chains associated with access points 104 are switched off/deactivated during these periods to conserve power. A radio frequency chain includes components, for example radio frequency amplifiers, encoders/decoders, or filters, associated with each transmit/receive antenna used by the access points. Switching off a single radio frequency chain in an access point can lead to savings of 2-3 Watts of power, and multiples thereof for an access point with multiple radio frequency chains.

Several non-peripheral access points 104 that surround an access point which is closest to a current location of the mobile device 110 are included in a set of concentric access points 106. Each set of concentric access points 106 may include peripheral and/or non-peripheral access points with overlapping coverage areas. In FIG. 1, concentric access points 106 are connected with lines labeled 106. A minimum subset of concentric access points 106 which are capable of providing a dead-zone free area around the access point closest to the mobile device are included in a set of collaborative access points 108. A dead-zone free area in the WLAN is one where the access points 108 collaborate to provide optimal performance and to ensure that continuous coverage is provided to mobile device 110. In FIG. 1, collaborative access points 108 are connected with lines labeled 108.

The concentric and collaborating access points 106 and 108 are defined during initial deployment by taking into account radio frequency considerations within the deployment zone. Radio frequency considerations may include, for example, pillars, walls or other structures that may obstruct radio frequency. In some embodiments, each of the concentric and collaborating access points 106 and 108 are configured to always know its immediate neighbors. In other embodiments, the access points may be configured to dynamically determine neighboring access points. To avoid channel conflict, the access points may include a feature which enables them to handle channel allocations and power levels to minimize the radio frequency interference among the neighboring access points. Due to the dynamic nature of the access points coverage zones, this feature is pre-calibrated on a zonal basis (for each set of collaborative access points 108) and on a global basis (for all the access points in the coverage area). Pre-calibration of zones helps in reducing the handover time for a roaming mobile device. It should be noted that whether or not this feature or similar features are included in the access points, the access points are deployed in a manner that minimizes interference.

In some embodiments, thresholds are defined for handovers, that is, at least one predetermined threshold defines when a roaming mobile device is disassociated from a current access point and is associated with another access point. These predetermined thresholds are defined based on, for example, the most optimal time for a handover to occur for the roaming mobile device.

Due to unidirectional radio frequency field requirements, antennas such as Parabolic and Yagi antennas may be installed on peripheral access points 102. It should be noted that other types of antennas may be used and that those noted above are non-limiting examples. Vertical antennas are installed on non-peripheral access points 104 for a more uniform, omni-directional spread.

Radio frequency chains within non-peripheral access points 104 are methodically activated and deactivated, depending on the presence of mobile device 110. In some embodiments, when mobile device 110 roams into the coverage area of WLAN 100, at least one of peripheral access points 102 automatically detects a signal transmitted from the mobile device and associates with the mobile device, according to the network standard implemented on WLAN 100. As mobile device 110 moves inward in the coverage area of WLAN 100, there is typically a need to power-on/enable non-peripheral access points 104 in the geographical vicinity of the mobile device. Hence, the associated peripheral access point 102 sends wake up signals to those access points in the vicinity of mobile device 110 to activate the radio frequency chains associated with those access points. The enabled access points in the vicinity of mobile device determine which of them is closest to mobile device 110 by, for example, using the mobile device 110 radio frequency strength to determine where the mobile device is located and to determine which access point is closest to the location of the mobile device. The closest access point to a given location typically provides the best coverage in that location. Once the closest access point is determined, all other access points in the WLAN remain powered off, except for the closest access point and an associated set of concentric access points 106 that surrounds the closest access point. The closest access point and the set of concentric access points 106 track the mobile device's movement by, for example, constantly monitoring mobile device 110 radio frequency strength.

Figure 2:
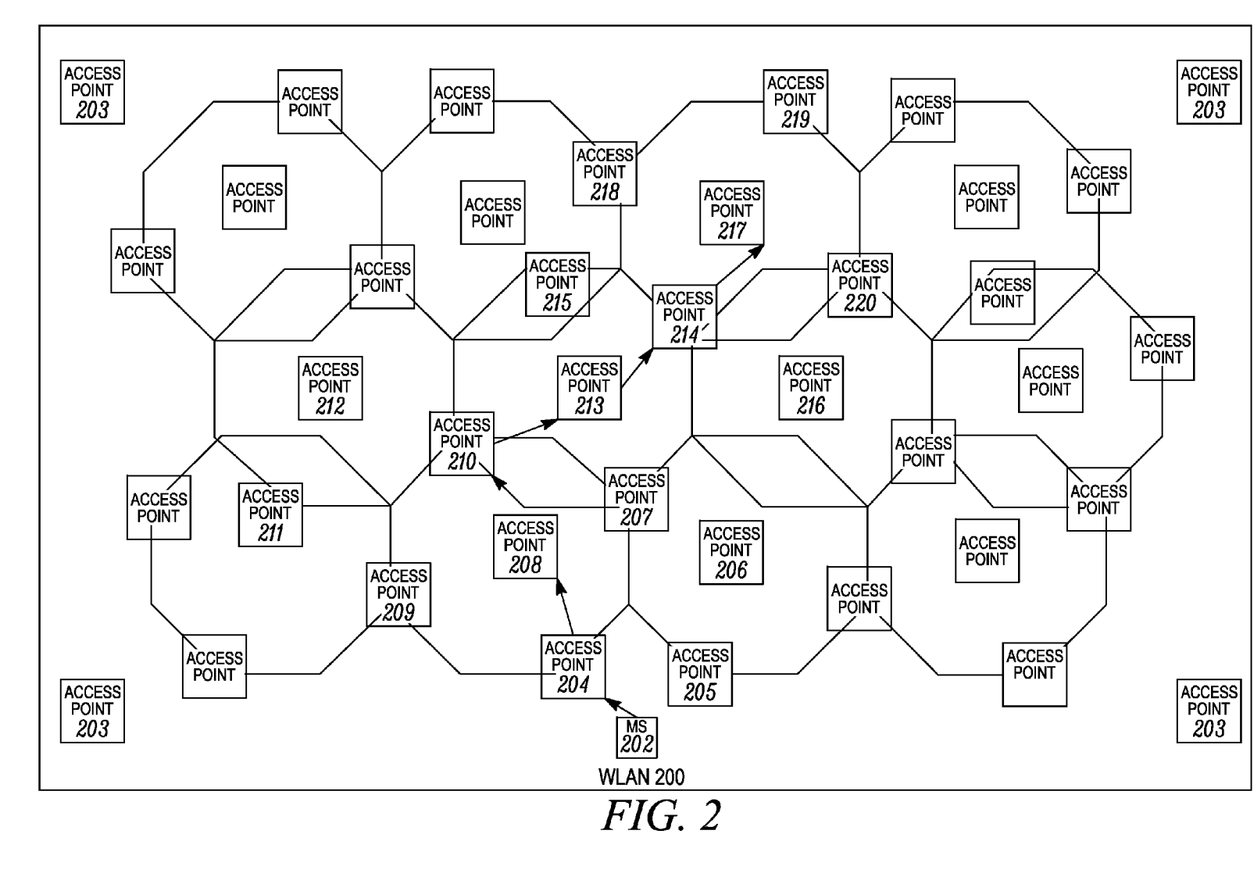
FIG. 2 is a block diagram of a WLAN wherein access points are activated based on movement of a mobile device in accordance with some embodiments.

FIG. 2 is a block diagram of a WLAN 200, wherein access points are enabled based on movement of a mobile device 202. Mobile device 202 may enter WLAN 200 to ultimately travel to a location best covered by access point 217. When mobile device 202 reaches a location best covered by access point 204, a peripheral access point 203 detects the entry of mobile device 202 into the WLAN coverage area and activates the radio frequency chains of non-peripheral access points 204-209. As mobile device 202 travels to a location best covered by access point 208, access points 205 and 206 are replaced with access points 204 and 210 in the set of concentric access points that are associated with access point 208. As mobile device 202 moves to a location best covered by access point 210, access point 204 is replaced with access points 211-213 in the set of concentric access points that are associated with access point 210. When mobile device 202 moves to a location best covered by access point 213, the set of concentric access points associated with access point 213 includes access points 207, 210, 214 and 215. When mobile device 202 moves to a location best covered by access point 214, the set of concentric access points associated with access point 214 includes access points 213 and 215-218. When mobile device 202 reaches its destination and travels around a location best covered by access point 217, the set of concentric access points associated with access point 217 includes access points 214 and 218-220. As noted above, as mobile device 110 moves within the WLAN coverage area, only those access points considered to best cover the current location of the mobile device and the associated set of concentric access points are enabled and powered on. All other access points in the WLAN coverage area are powered off.

Figure 3:
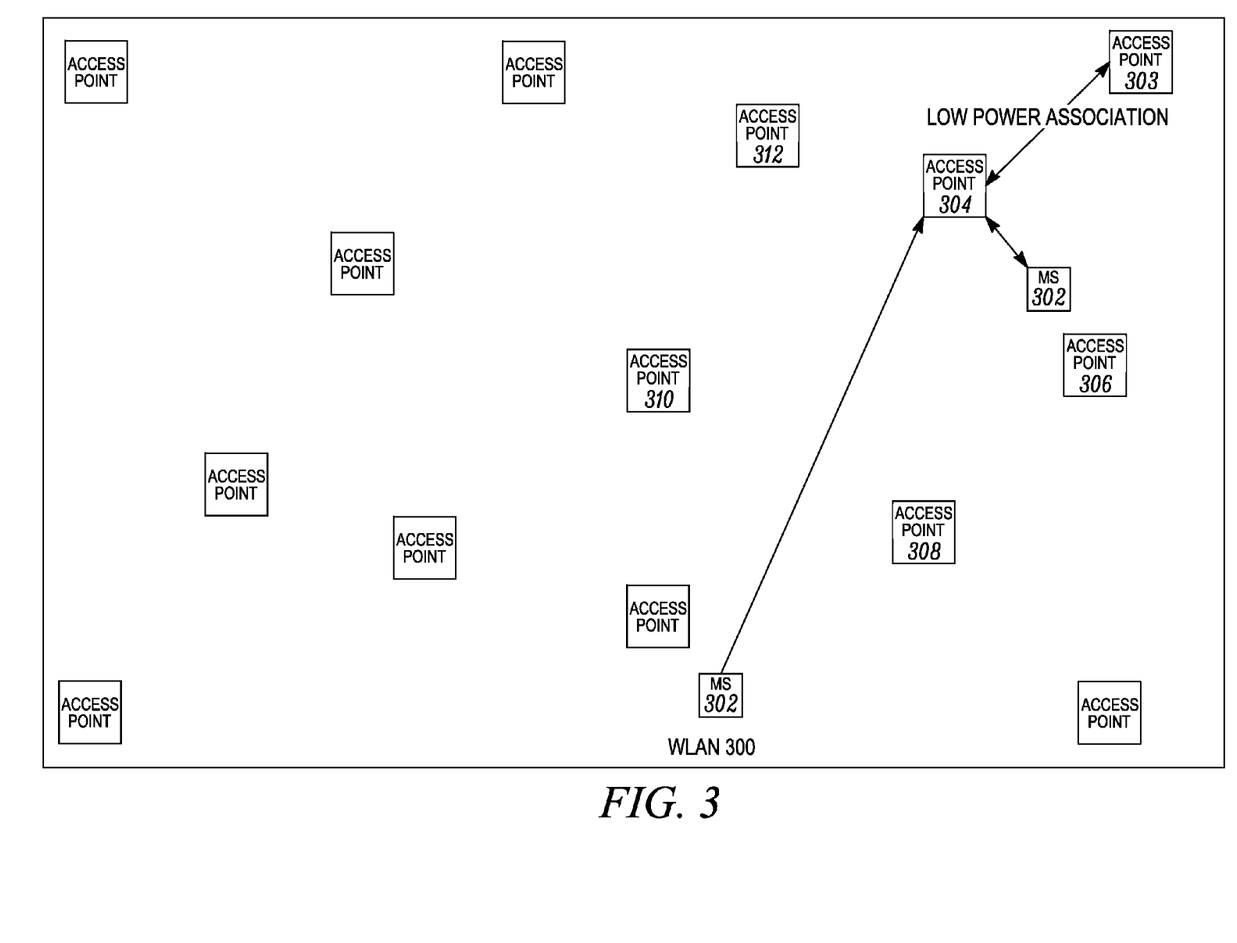
FIG. 3 is a block diagram of a WLAN wherein access points are detected as being activated as a mobile device moves into the WLAN coverage area in accordance with some embodiments.

FIG. 3 is a block diagram of a WLAN 300 wherein access points are detected as being activated as the mobile device moves into the WLAN coverage area. As mobile device 302 enters WLAN 300 and travels to a coverage area best supported by access point 304, peripheral access point 303 initially detects the presence of mobile device 302 and provides coverage to mobile device 302. When peripheral access point 303 determines that access point 304 is the closest access point to mobile device 302, peripheral access point 303 activates the radio frequency chains of access points 304-312 by, for example, using a locate-enable-position-optimize principle. The enabled access points then determine that access point 304 is the closest access point to the mobile device's current location and the other enabled access points are included in the set of concentric access points associated with access point 304.

Figure 4:
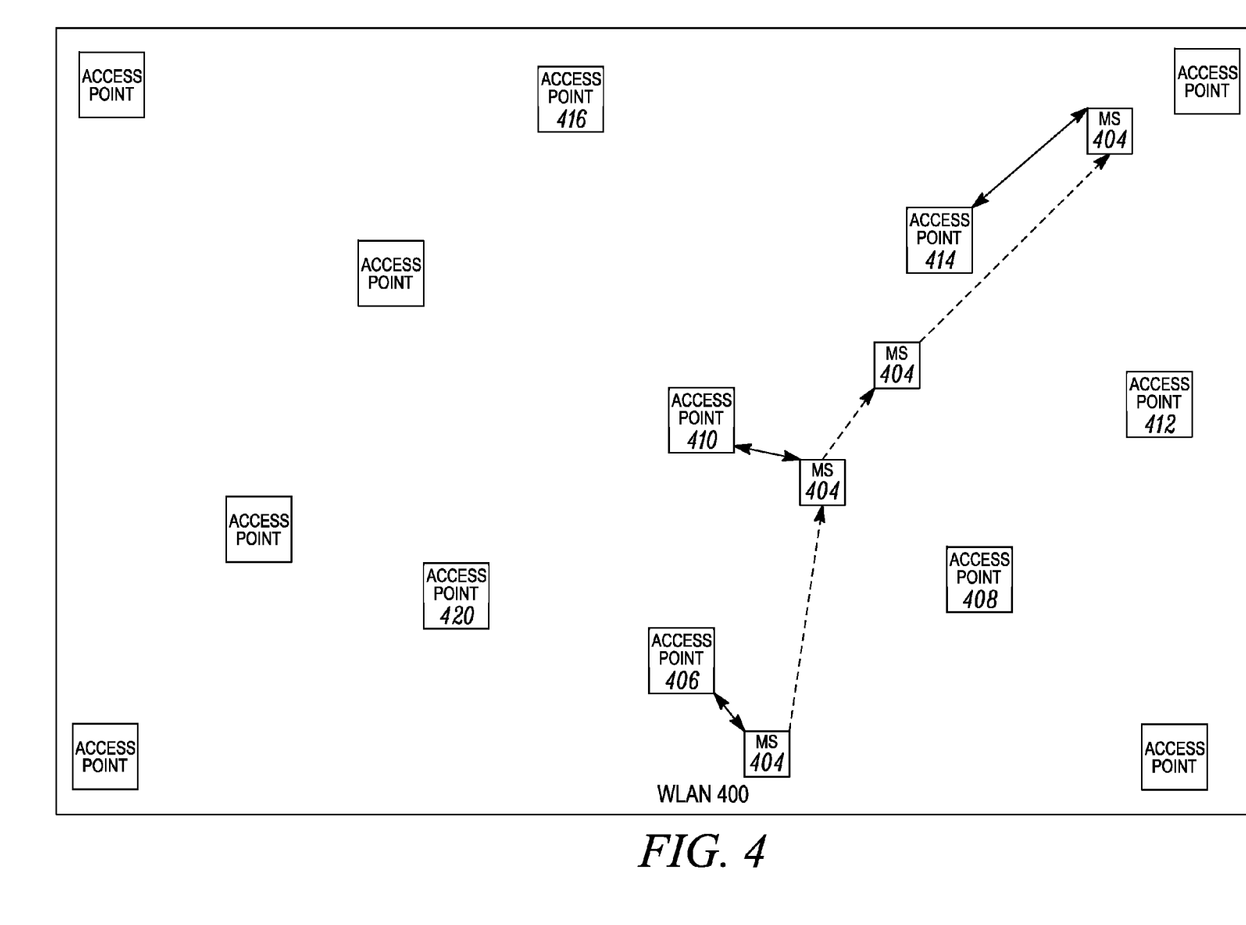
FIG. 4 is a block diagram of a WLAN wherein the movement of a mobile device is tracked by a set of collaborating access points in accordance with some embodiments.

FIG. 4 is a block diagram of a WLAN 400 wherein the movement of a mobile device 404 is tracked by a set of collaborating access points. When mobile device 404 enters the WLAN 400 coverage area, mobile device 404 is initially associated with access point 406. As mobile device 404 moves into an area best supported by access point 410, as determined by constant monitoring of the mobile device's radio frequency signal strength by access point 406 and the associated set of collaborating access points, mobile device 404 is associated with access point 410 as the closest access point. Access points 406, 408, and 420 serve as the collaborating access points for access point 410. If mobile device 404 moves to a location at an equal distance between access points 410 and 414 and neither access point is considered as the closest access point to the mobile device's current location, mobile device 404 is disassociated from access point 410. Mobile device 404 is then served by access point 414, as it is assumed to be the closest access point based on the mobile device's movement. When mobile device reaches its destination at a location best served by access point 414, mobile device 404 remains associated with access point 414 and access points 408, 410 412 and 416 serve as the collaborating access points for access point 414.

Returning to FIG. 1, in some embodiments, to associate a non-peripheral access point 104 with mobile device 110, peripheral access points 102 locate the non-peripheral access point that records the best signal strength from the mobile device's current location. As is known to those skilled in the art, current networking standards enable the closest access point, that is, the one that provides the best coverage to the mobile device's current location, to automatically associate itself with mobile device 110. Upon determining the closest access point, a set of collaborative access points 108 around the closest access point is determined. The radio frequency chains of the set of collaborative access points 108 are activated so that these access points can provide a coverage buffer.

As mobile device 110 moves, the closest access point detects a change in the mobile device's signal strength and the next closest access point is determined and associated with the roaming mobile device. A second set of collaborative access points 108 around the new closest access point is established. Those access points from the first set of collaborative access points 108 that are not in the second set are powered off. In an embodiment, when an isolated mobile device is stationary in its location of frequent usage, a supplementary power saving scheme is implemented.

In embodiments, various scanning methods are used for determining whether a mobile device is associated with an access point and for determining if the access point should be powered on. For example, in some embodiments, instead of deploying a peripheral access point as an always-on access point, a scanning scheme may traverse a Hamiltonian path of all non-peripheral access points by intermittently activating the radio frequency module of each periodically enabled access point. The Hamiltonian path scanning scheme is one which causes each non-peripheral access point to be periodically enabled once during each scan cycle. This scheme scans for mobile devices associated with each periodically enabled access point and powers off an access point if no mobile devices are found to be associated with the access point. In some embodiments, this scheme is used in conjunction with the peripheral access points to provide better coverage. In other embodiments, this scheme is used on all access points and eliminates the need for the always-on peripheral access points.

Another scanning scheme may configure fixed wireless clients, for example desktops or mobile phones that are always on, as scouts for other mobile devices. Upon detecting a mobile device, the scout alerts a network controller to activate a surrounding access point.

Figure 5:
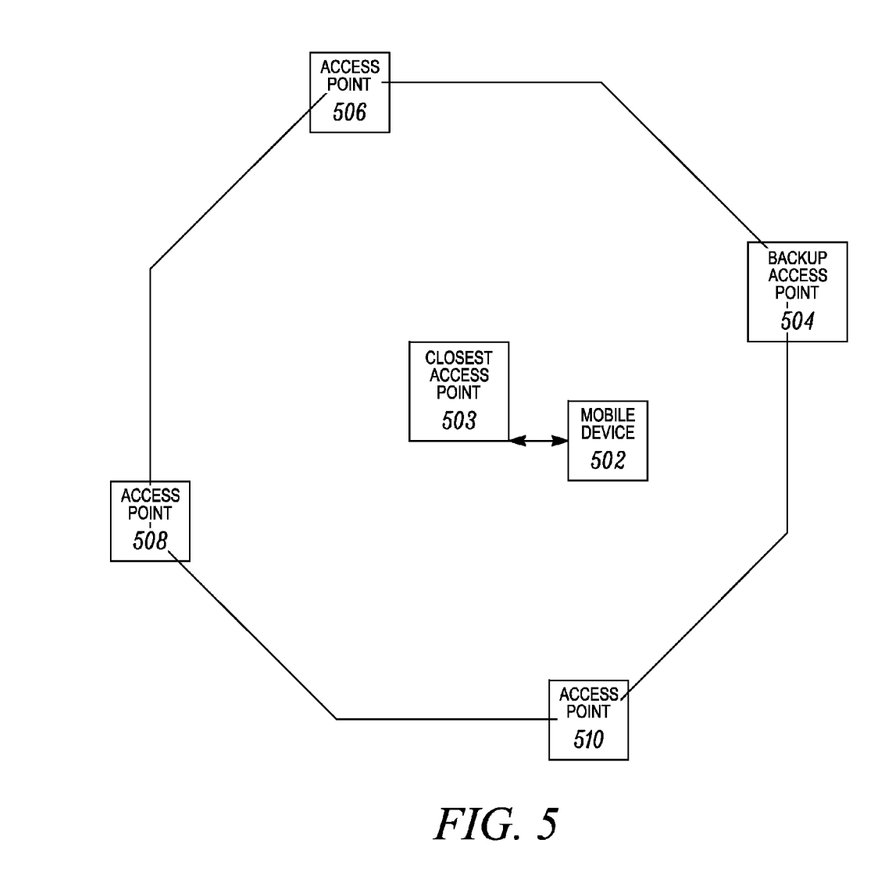
FIG. 5 is a block diagram of a set of access points that are associated with an isolated mobile device in accordance with some embodiments.

FIG. 5 is a diagram of a set of access points that are associated with an isolated mobile device. When a set of concentric access points 503-510 associated with mobile device 502 determines that mobile device 502 is stationary and there is no significant change in the mobile device's transmit signal strength for a predetermined time interval, the supplementary power saving scheme may be employed. Specifically, when the closest access point 503 determines that there is no significant change in the mobile device's 502 transmit power for a predetermined interval, access point 503 determines a backup access point 504 from the set of concentric access points 504-510. Both the closest access point 503 and the backup access point 504 maintain radio frequency module activation and continue to serve mobile device 502. The radio frequency modules for all other access points 506-510 in the set of concentric access points associated with the closest access point are deactivated. Power levels are continuously monitored while the access point is in a point-to-point mode, that is, while the access point 503 is directly serving the mobile device. If there is a drop in transmit power from mobile device 502, the closest access point 503 signals that mobile device 502 is possibly in motion. The closest access point 503 sends a message to the associated set of concentric access points to activate the radio frequency chains for those access points.

As mobile device 502 moves and the closest access point 503 detects a change in signal strength, the next closest access point is determined and associated with the roaming mobile device. A second set of collaborative access points around the new closest access point is established. Those access points from the first set of collaborative access points that are not in the second set are deactivated and powered off. Once a new backup access point is found for the new closest access point, all access points in the second set, except the new backup access point, are powered off.

Wireless switches within medium to large high density WLAN installations can be enabled to manage, configured and monitor the access point power saving schemes. Access points are deployed within the WLAN by taking into account site planning and deployment considerations. Some site planning and deployment considerations include the minimum distance between adjacent access points, the time required for the radio frequency module in an access point to completely initialize and start beaconing after an activating request, the average mobile device roaming speed, and the access point re-association time with the mobile device. It should be apparent to those skilled in the art that other considerations may be included during site planning and deployment and that those noted above are non-limiting examples.

Figure 6:
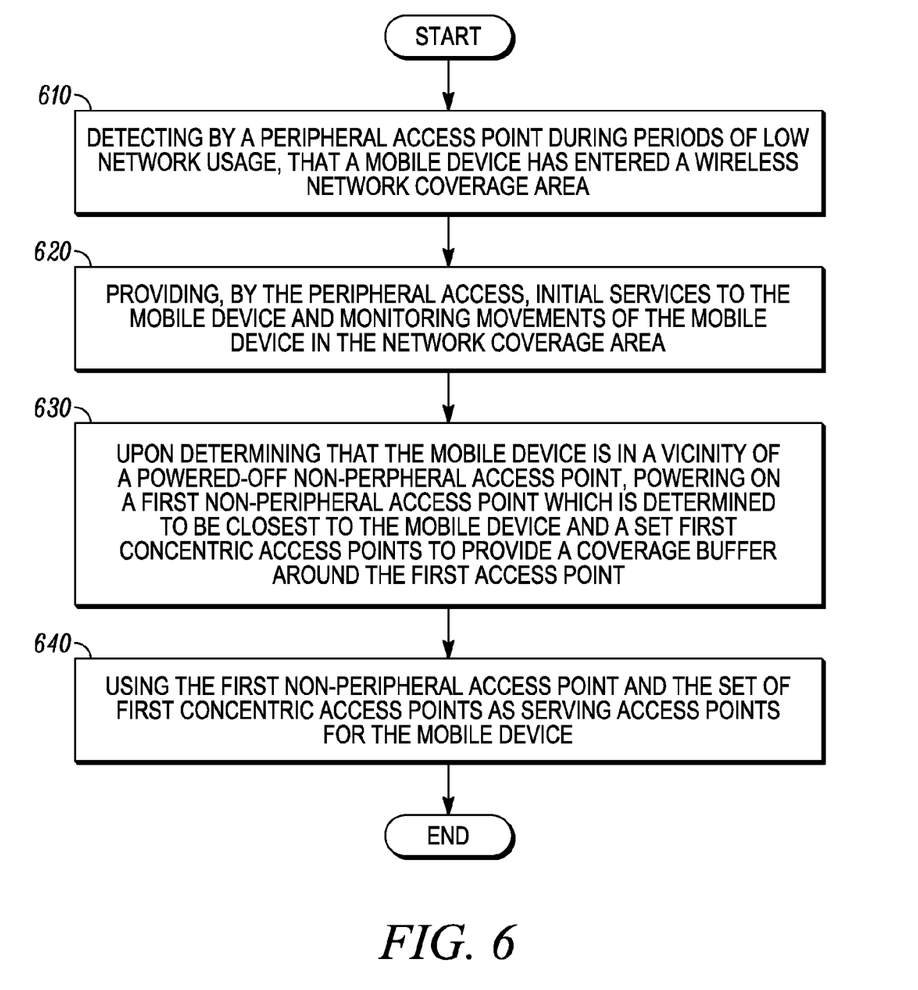
FIG. 6 is a diagram of a flowchart of a method of efficiently conserving power usage of access points in a WLAN during low network usage intervals in accordance with some embodiments.

FIG. 6 is a diagram of a flowchart of a method of efficiently saving power used by access points in a WLAN during low network usage intervals. In 610, detecting, by a peripheral access point during periods of low network usage, that a mobile device has entered a wireless network coverage area. In 620, providing, by the peripheral access, initial services to the mobile device and monitoring movements of the mobile device in the network coverage area. In 630, upon determining that the mobile device is in a vicinity of a powered-off non-peripheral access point, powering on a first non-peripheral access point which is determined to be closest to the mobile device and a set of first concentric access points to provide a coverage buffer around the first access point. In 640, using the first non-peripheral access point and the set of first concentric access points as serving access points for the mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for conserving power usage of access points in a network during low usage intervals, comprising:
   detecting, by a peripheral access point during periods of low network usage, that a mobile device has entered a wireless network coverage area;
   providing, by the peripheral access point, initial services to the mobile device and monitoring movements of the mobile device in the network coverage area;
   determining that the mobile device is in a vicinity of a powered-off non-peripheral access point by locating a first non-peripheral access point with a recorded best signal strength from a current location of the mobile device and selecting an associated set of first concentric access points around the first non-peripheral access point, whereupon
   powering on the first non-peripheral access point which is determined to be closest to the mobile device and the set of first concentric access points to provide a coverage buffer around the first non-peripheral access point;
   using the first non-peripheral access point and the set of first concentric access points as serving access points for the mobile device; and
   scanning non-peripheral access points, by traversing a Hamiltonian path of the non-peripheral access points and scanning for a mobile device associated with each non-peripheral access point, to determine which non-peripheral access point is associated with the mobile device, maintaining power at each non-peripheral access point with an associated mobile device, and deactivating each non-peripheral access point with no associated mobile device.

2. The method of claim 1, further comprising tracking movements of the mobile device in the network coverage area by at least one of a closest access point to the mobile device or concentric access points.

3. The method of claim 2, wherein the tracking comprises monitoring radio frequency signal strength of the mobile device.

4. The method of claim 1, wherein the powering on comprises sending a signal to the first non-peripheral access point and the set of first concentric access points and activating associated radio frequency chains for the first non-peripheral access point and the set of first concentric access points.

5. The method of claim 1, further comprising:
   upon determining that the mobile device has moved to a vicinity of a second non-peripheral access point which is determined to be closest to the mobile device, powering on the second non-peripheral access point and a set of second concentric access points;
   powering off the first non-peripheral access point and those access points in the set of first concentric access points that are not included in the set of second concentric access points; and
   using the second non-peripheral access point and the set of second concentric access points as serving access points for the mobile device.

6. The method of claim 1, further comprising determining, by each set of concentric access points, which access point in the vicinity of the mobile device is the closest access point.

7. The method of claim 1, wherein instead of determining that the mobile device is in a vicinity of a powered-off non-peripheral access point, the method comprises, periodically enabling each non-peripheral access point in the network coverage area once during a scan cycle, scanning periodically enabled, non-peripheral access points to determine which non-peripheral access point is associated with the mobile device, and maintaining power at each periodically enabled, non-peripheral access point with an associated mobile device.

8. The method of claim 1, wherein the determining that the mobile device is in a vicinity of a powered-off non-peripheral access point comprises using fixed wireless clients to alert a network controller upon detection of the mobile device and selecting a non-peripheral access point closest to an alerting wireless client and an associated set of concentric access points as the first non-peripheral access point and the set of first concentric access points.

9. The method of claim 1, further comprising, upon determining that an isolated mobile device is stationary for a predetermined time interval and in a location of frequent usage,
   selecting, by an access point closest to the mobile device, a backup access point from a set of concentric access points;
   maintaining activation of the closest access point and the backup access point to service the mobile device; and
   deactivating access points in the set of concentric access points that are not the closest access point or the backup access point.

10. The method of claim 9, further comprising continuously monitoring, by the closest access point, the power level of the mobile device and activating the set of concentric access points when a drop in transmit power from the mobile device is detected, wherein a new closest access point and a backup access point is selected upon determining by the set of concentric access that another access point is closest to the mobile device.

11. A network for conserving access point power usage during low network usage intervals, comprising:
   a plurality of peripheral access points, each of which is deployed at an edge of a wireless network coverage area; and
   a plurality of non-peripheral access points, each of which is deployed within the network coverage area in locations where at least one peripheral access point provides predefined coverage services, and each of which is powered off during periods of low network usage,
   wherein upon detecting, by a peripheral access point during periods of low network usage, that a mobile device has entered the network coverage area, determining that the mobile device is in a vicinity of a powered-off non-peripheral access point by locating a first non-peripheral access point with a recorded best signal strength from a current location of the mobile device and selecting an associated set of first concentric access points around the first non-peripheral access point, whereupon powering on the first non-peripheral access point which is determined to be closest to the mobile device and the set of first concentric access points to provide a coverage buffer around the first non-peripheral access point, and
   wherein the first non-peripheral access point and the set of first concentric access points are used as serving access points for the mobile device; and wherein the network is operable to scan non-peripheral access points, by traversing a Hamiltonian path of the non-peripheral access points and scanning for a mobile device associated with each non-peripheral access point, to determine which non-peripheral access point is associated with the mobile device, the network further operable to maintain power at each non-peripheral access point with an associated mobile device, and deactivate each non-peripheral access point with no associated mobile device.

12. The network of claim 11, wherein each of the peripheral access points has unidirectional radio frequency field requirements.

13. The network of claim 11, wherein each of the non-peripheral access points includes vertical antennas which provide a uniform omni-directional spread.

14. The network of claim 11, wherein each of the non-peripheral access points is installed in areas in the network coverage area where peripheral access points provide limited coverage or no coverage.

15. The network of claim 11, wherein at least one non-peripheral access point is always powered on in an location in the network coverage area where peripheral access points provide no coverage.

16. The network of claim 11, wherein the non-peripheral access points are configured to dynamically determine neighboring access points.

17. The network of claim 11, wherein the non-peripheral access points are configured to include a component which handles channel allocations and power levels to minimize radio frequency interference among the neighboring access points.

18. The network of claim 11, wherein a threshold for handover of a roaming mobile device is predefined.

* * * * *